United States Patent [19]

Weiss

[11] Patent Number: 4,660,828
[45] Date of Patent: Apr. 28, 1987

[54] REACTIVE CONTROL APPARATUS

[75] Inventor: John Weiss, Amityville, N.Y.

[73] Assignees: Allen Schwab; Richard Schwab, both of Manhasset; Michael Jacoabs, Wantagh; William R. Woodward, Bronx, all of N.Y.

[21] Appl. No.: 561,989

[22] Filed: Dec. 14, 1983

Related U.S. Application Data

[63] Continuation-in-part of Ser. No. 504,615, Jun. 15, 1983, abandoned.

[51] Int. Cl.⁴ ............................................... A63B 21/04
[52] U.S. Cl. .................................... 272/138; 200/6 A
[58] Field of Search ............... 272/137, 141, 143, 138, 272/DIG. 5, 130, 135, 136, 140, 142; 200/6 A, 153 K; 338/121; 324/65 R; 340/687; 128/25 R

[56] References Cited

U.S. PATENT DOCUMENTS

| | | | |
|---|---|---|---|
| 3,365,975 | 1/1968 | Hathaway | 200/6 A X |
| 3,371,166 | 2/1968 | Wolfe | 200/6 A |
| 3,587,319 | 6/1971 | Andrews | 272/130 X |
| 3,659,842 | 5/1972 | Aijala . | |
| 3,857,093 | 12/1974 | Green | 324/65 R |
| 3,917,918 | 11/1975 | Vannest et al. | 200/153 K X |
| 3,945,704 | 3/1976 | Kraus et al. | 340/687 X |
| 4,008,466 | 2/1977 | Smith | 324/65 R |
| 4,122,390 | 10/1978 | Kolcite et al. | 324/65 R |
| 4,170,351 | 10/1979 | Ozbey et al. | 272/143 X |
| 4,171,470 | 10/1979 | Gettig | 200/6 A |
| 4,278,095 | 7/1981 | Lapeyre . | |
| 4,349,708 | 9/1982 | Asher | 200/153 K X |
| 4,494,662 | 1/1985 | Clymer | 272/143 X |

FOREIGN PATENT DOCUMENTS 2038597 of 1889 United Kingdom .

Primary Examiner—Richard J. Apley
Assistant Examiner—Robert W. Bahr
Attorney, Agent, or Firm—Frishauf, Holtz, Goodman & Woodward

[57] ABSTRACT

An apparatus for exercise has a frame structure for hand holding standing up on a restrained universal mount fixed on a platform. A coil spring in compression and a stretched elastic cord laced around in tension restrains the universal mount providing adequate force for restoring the frame structure to its normal vertical position except as the user of the device deflected from that position. A two-axis sensor at the pivot center within the universal mount provides electrical inputs to a computer game programmed for video display. The position of the structure determines the direction of activity and the deflection specifies the amount of exertion input within the framework of a computer program for simulation of any of a variety of existing and new sports. The characteristics of the universal mount offer the player a challenge in terms of muscular strength, coordination and body balance.

15 Claims, 16 Drawing Figures 4,660,828

REACTIVE CONTROL APPARATUS

This application is a continuation-in-part of application Ser. No. 504,615, filed June 15, 1983 now abandoned.

This invention relates to exercise equipment, particularly to the interaction of exercise and computer to simulate a variety of sports.

BACKGROUND OF THE INVENTION

Since the beginning of sports, equipment has played a major role in the performance and enjoyment of the sport. Discus throwing and pole vaulting are examples of the early interaction of equipment and the athlete. Technological advances have helped to break many sports records and is responsible for creating many new sports. Often with new technology sports, such as hang gliding, boardsailing and skiing, an element of danger prevents many people from participating. Also, the frustration in the early learning stages can be discouraging.

Simulators have been used to bridge the learning process and build confidence. One example is the ski training device (U.S. Pat. No. 3,659,842) that used a boot mounting system above pivoting cantilever arms to allow a feel of cushioned turning as with downhill skiing.

Computers have been used to increase the information associated with standard exercise devices, tredmills, cycle exercisers, and rowing machines and to control the exercise program, as in Lapeyre's exercise monitor (U.S. Pat. No. 4,278,095). Besides the information gathering and analysis, computers can be helpful in providing the stimulus to overcome the boredom of exercise and create an environment on the video screen to enhance the involvement with the exercise. Uemura (U.K. Pat. No. 2038597) teaches the use of pure rotary motion, a turntable and roller game, to affect the computer game, here the rotation is in response to the twisting on a platform mounted on a bearing.

SUMMARY OF THE INVENTION

It is my invention to encompass a two axis position sensor within a restrained universal joint mounted on a platform with a handle bar used by the participant to overcome the restraining forces of the joint and position the handle bar in response to the action in a video game, thus affecting the position and speed of an object or the background. Every position of the user's center of gravity and every direction of force can be obtained from the deflection of the constrained universal joint and therefore the simulation of many sports can be obtained through the programmed input of the handle position. It is a further object of the invention to combine the foregoing with a restrained rotary coupling or platform and torque sensor to provide the equivalent of a three-axis spring-return position sensor to enable still more sports, especially gliding and flying, to be simulated.

DETAILED DESCRIPTION OF THE INVENTION

In the preferred embodiment, a handlebar is attached to a platform with a restrained elastic joint so that a force applied to the handle by a user while standing on the platform causes a rotation about the restrained elastic joint in the direction of the applied force. A joystick is mounted within the joint to sense the position of the handle and inputs the values of the position to a computer or video game as the user's response to the activity on the computer monitor.

Figure 1:
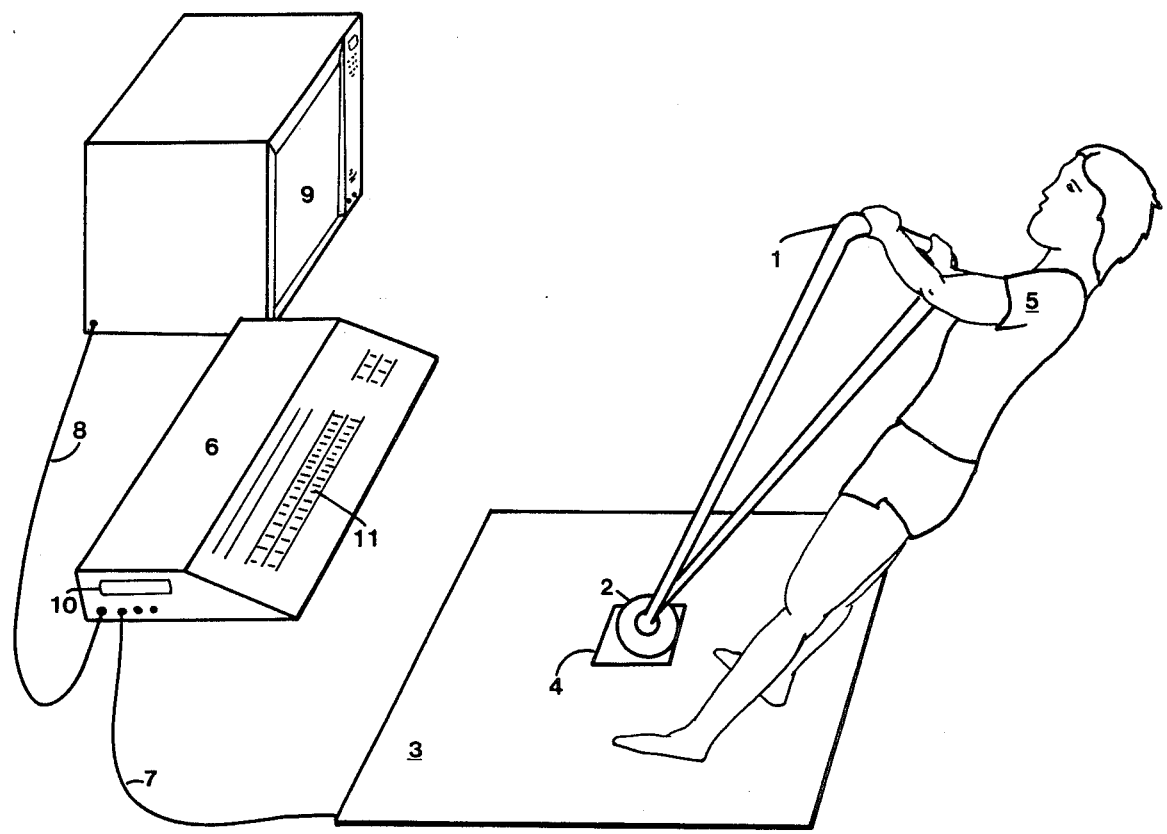
FIG. 1 is a perspective view of a system including exerciser, computer and video monitor.

As shown in FIG. 1 the handle 1 is formed from aluminum tubing into a shape to provide a horizontal section on the top and two vertical legs on the side for hand holding by the user 5. The vertical legs are attached to the top of the restrained universal joint 2. The joint 2 is rigidly attached to a base 4 and a platform 3. The user 5 stands on the platform 3 while holding onto the handlebar 1 and applies a force in any direction to affect the rotation of the handlebar 1 about a center of rotation within the restrained universal joint 2. A position sensor within the joint 2 inputs the handle position to a computer 6 through an input cable 7 for analysis by a computer program to affect graphic output to the video monitor 9 through the output cable 8. Programs can be loaded through the keyboard 11 or through a game cartridge 10. Mode changes including levels of difficulty, can be specified through the keyboard 11.

A complete variety of positions and force transfer through the user's body can be achieved. FIGS. 2, 3, 4 and 5 demonstrate four basic positions encountered with the invention. Many more positions exist as combinations and variations in between the basic positions.

Figure 2:
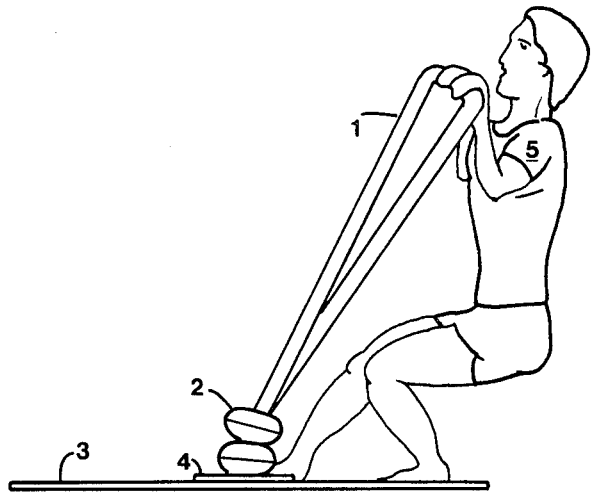
FIG. 2 is a side view of the exerciser with the user in the pulling mode.
Figure 3:
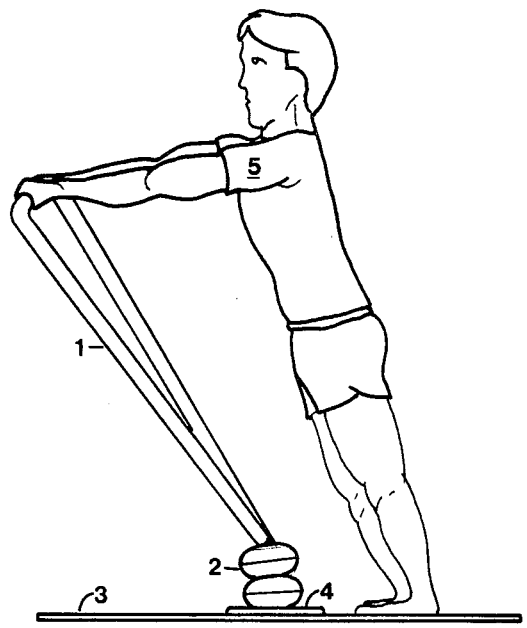
FIG. 3 is a side view of the exerciser with the user in the forward pushing mode.

The user 5 in FIG. 2 is shifting his weight backward while hanging from the handlebar 1 and with his feet in front of his body on the platform 3. This position is encountered in many sports that can be simulated. Some examples include windsurfing, waterskiing and motorcross. In order to reach the extreme of this position the user 5 would lower his center of gravity by bending the knees and pull the handlebar over his head. The alternate method of leaning the handlebar back is with a stiff posture, however recovery from this position can be difficult. The opposite of this position is shown in FIG. 3. The user 5 is leaning forward pushing the handlebar 1 in front of his body. Hang gliding, tobogganing and ski jumping are some examples of sports that can be simulated from this exercise.

Figure 4:
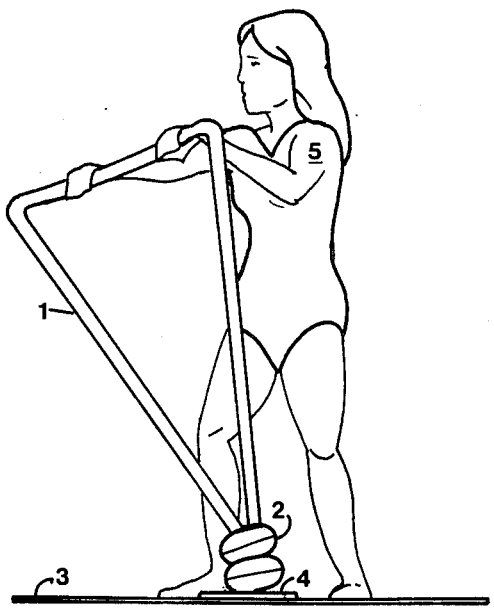
FIG. 4 is a front view of the exerciser with the user pushing to the right.
Figure 5:
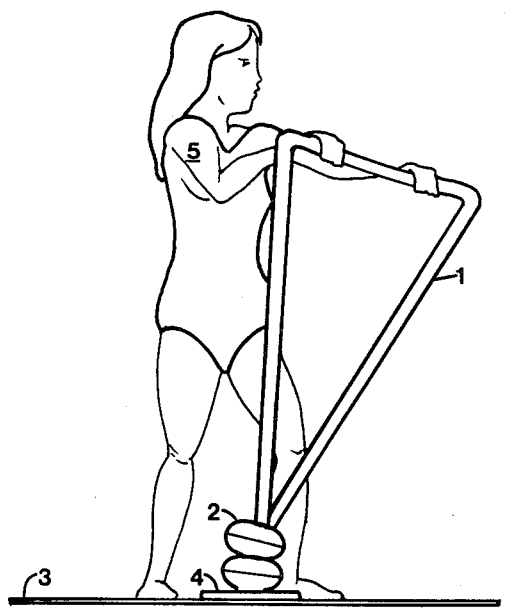
FIG. 5 is a front view of the exerciser with the user pushing to the left.

In FIG. 4 the user 5 is pushing the handlebar 1 to the right. The user 5 is shown standing on the platform 3 nearly erect and pushing the handlebar with her arms. This position is particularly important for exercises to enhance the chest and side muscles. Handlebar positions can be obtained by many different methods. The two basic techniques are pushing with the arms while the body is nearly upright and pulling to lift the body as a result of weight shift. The best method of achieving the correct handle position depends on the direction and speed of change from the previous positions in response to the activity on the video monitor. In order to change from the position of FIG. 2 to the handlebar position of FIG. 4 or FIG. 5 the user 5 would simply swing his lower body to the right for the handlebar position of FIG. 4 and to the left for the handlebar position of FIG. 5. The user would still be hanging as in FIG. 2. In order to change the user's position of FIG. 3 to the handlebar position of FIG. 4 and FIG. 5 it would be most efficient to come up to the upright positions as shown in FIG. 4 and FIG. 5.

Figure 6:
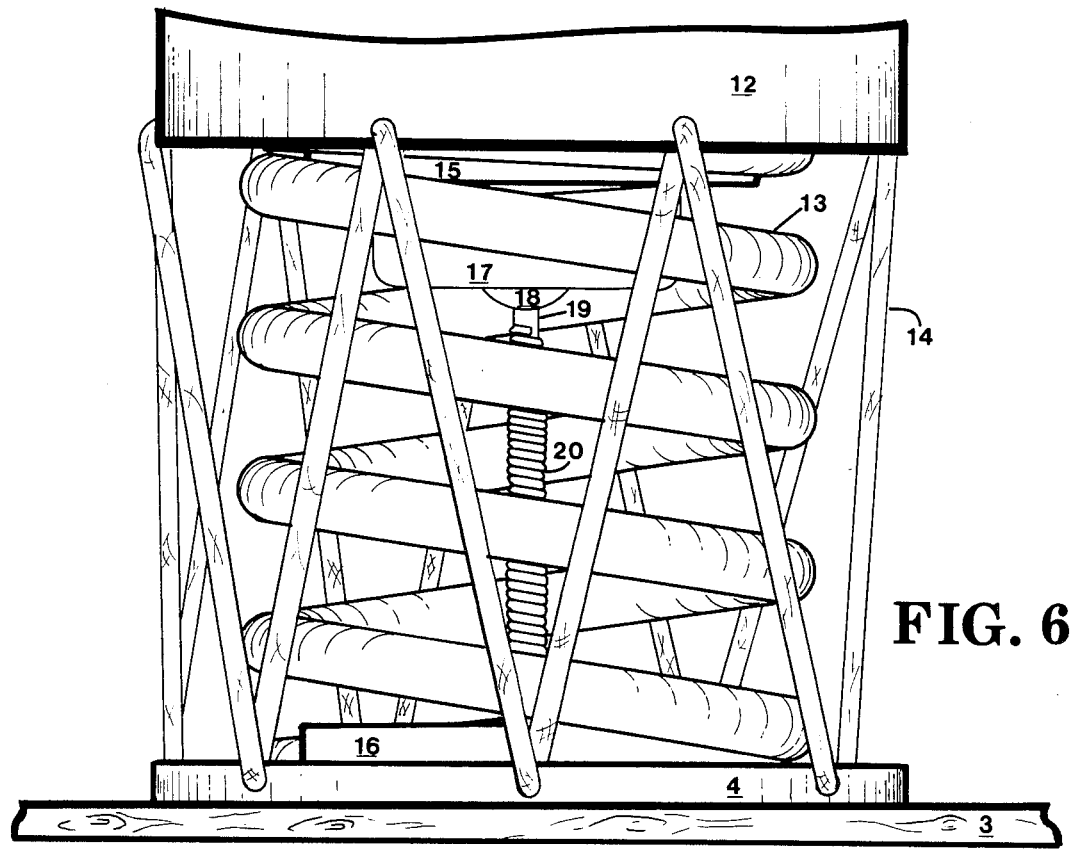
FIG. 6 shows an exemple of a universal restrained joint and joystick attachment.
Figure 7:
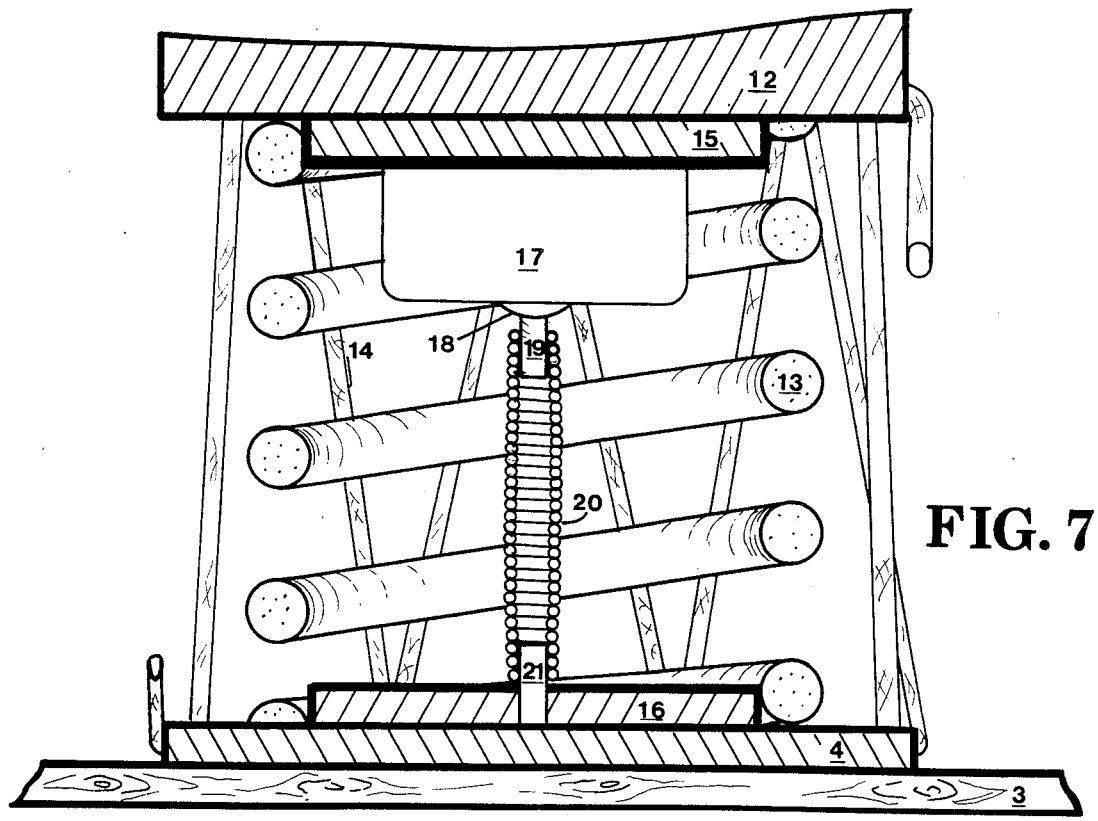
FIG. 7 is a crossection of the universal restrained joint and joystick attachment.

The universal restrained joint 2 of FIGS. 1–5 is detailed in FIG. 6 and FIG. 7. The design shows a composite spring constructed from a heavy duty compression spring 13 of 5" in diameter and a 5" length 1" pitch with a $\frac{1}{2}$" diameter wire size, coiled, with flat, square and ground ends. This compression spring 13 is nested between the handlebar connector 12 and the platform base 4 with an elastic tension cord 14 laced between the handlebar connector 12 and the base 4 surrounding the compression spring 13 on all sides. The compression spring 13 is centered and held in place by a top hub 15 and a bottom hub 16 that engage the inside diameter of the spring ends. The top hub 15 is attached to the handlebar connector 12 and the lower hub 16 is attached to the base 4. The tension cord 14 compresses the compression spring 13 to a desired amount. The bending torque through the joint can be adjusted by tightening the tension cord to increase the force required to operate the handle and by loosening the tension cord 14 to decrease the operating force. The compression spring 13 is always in the compression mode and thus greatly increases the life of the spring. When a force is applied to the handle the corresponding torque is resisted by the compression of the spring 13 on the side of the applied force and by the tension of the tension cord 14 along the side opposite to the spring compression. A joystick mechanism 17 is mounted to the handlebar connector 12 and the top hub 15 in the center of the compression spring 13. The joystick mechanism 17 is of the dual potentiometer type and must be aligned with the horizontal selection of the handlebar. One potentiometer is to sense the forward and backward positions, and the other is to sense the right to left positions. The joystick shaft 19 is attached to the joystick mechanism 17 through a ball joint 18. A compensator spring 20 is attached to the joystick shaft 19 and to the center of the bottom hub 16 by attachment to the base post 21. This spring is always in tension and has a relatively low spring rate to insure a small force, to the joystick mechanism to prevent damage. When the handle force is applied the compression spring 13 and tension cord 14 are working in opposition and the entire upper structure including handlebar 1, handlebar connector 12, top hub 15, and the joystick mechanism 17 travel through the handlebar angle. The compensator spring 20 extends to compensate for length changes and keeps the joystick shaft 19 pointed towards the base post 21 and thus effects the joystick position. The computer program is continuously reading the joystick position and analyzing the position, change in position and the rate of change to control the video display.

FIG. 6 and FIG. 7 illustrate one method of construction for the restrained universal joint, however, the invention is not limited by any particular configuration. This joint can be fabricated from a single hollow urethane rubber molded part that would act as the compression and tension members. In addition, periferal devices can be attached to the handlebar 1 or platform 3 for interactive computer output. Spring loaded handle grips, foot switches, foot straps, and harnesses are some examples of add-on devices to complicate the control and increase the challenge of the video sport. The restrained universal mount should preferably be capable of permitting displacement of the handlebar structure from its unactuated position by an angle of at least 60° about said universal joint as a fulcrum in any direction of displacement.

Figure 8:
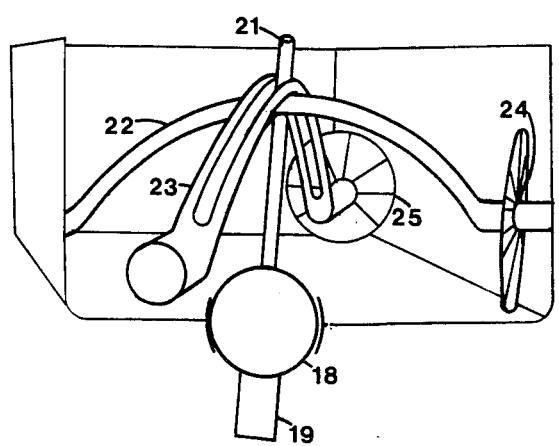
FIG. 8 is a diagrammatic perspective view of a joystick control signal generator device on an enlarged scale.

FIG. 8 shows the angular sensor referred to above as the "joystick" in a commonly available form. The external lever 19, the provision of which is set by the spring 20 in FIGS. 6 and 7 has a ball pivot 18 and an internal extension pin 21 that passes through the slots of two pivoted arches 22 and 23 that pivot about manually perpendicular axes and respectively drive the shaft of the potentiometers 24 and 25. The angular displacement of the pin 21 is thereby resolved into angular displacements about two mutually perpendicular axes and the respective potentiometers provide electrical signals corresponding to the respective angular displacements about these two axes. One of these axes is preferably aligned parallel to the line between the grips of the handlebar in the rest position of the handlebar structure.

FIGS. 6 and 7, as already mentioned, show the preferred construction for the restrained universal mount for the handle bar frame 1. Of course the compression resilient member 13 and the tension resilient member 14 can have other forms, for example they could be tubes of resilient foam, of great thickness in the former case and of less thickness in the latter, for instance. It is also conceivable that a single hollow urethane rubber molded part would act as both the compression and tension member, the difficulty in such a case being mainly in providing a firm enough attachment at the top and bottom to resist tearing stresses.

Peripheral devices can be attached to the handle bar 1 or platform 3 for supplementary interactive computer inputs. Spring loaded handle grips, foot switches, foot straps and harnesses are some examples of add-on devices to complicate the control of the display and increase the challenge of the video sport. A reactive torsion joint could be superposed on the top member 12 of the reactive universal mount of FIGS. 6 and 7 or a horizontal surface capable of rotating about the universal mount might be provided for the feet of the user, either freely rotatable or reactively restrained, as shown in FIGS. 9–13. In the latter cases the torsion of rotary members could be caused to operate a third potentiometer.

Figure 11:
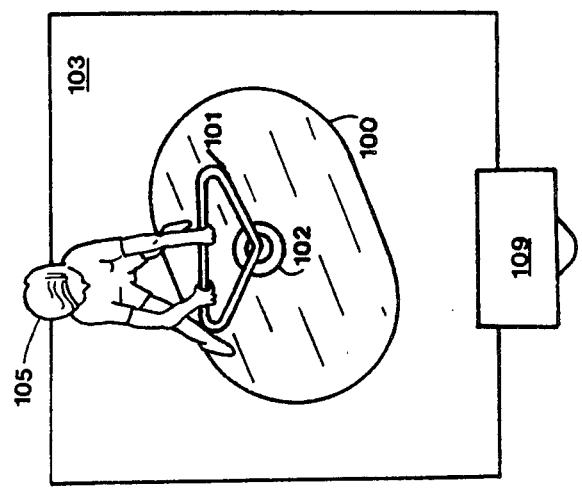
FIGS. 9, 10 and 11 are top views of three positions of a three-axis display control device using a restrained universal joint and a preferred form of a third-axis restrained rotation element constituted as a rotary platform.
Figure 10:
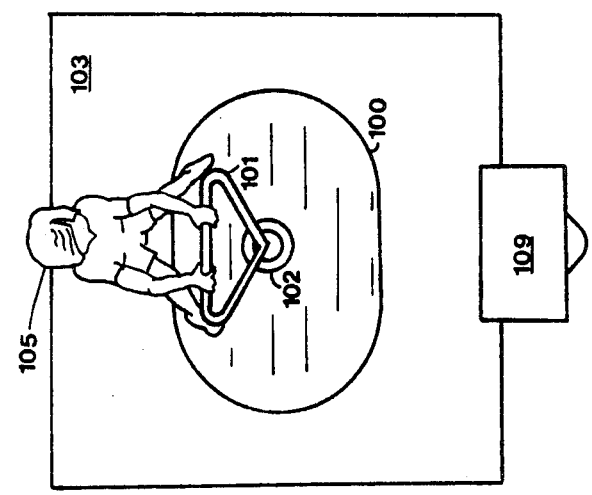
Figure 9:
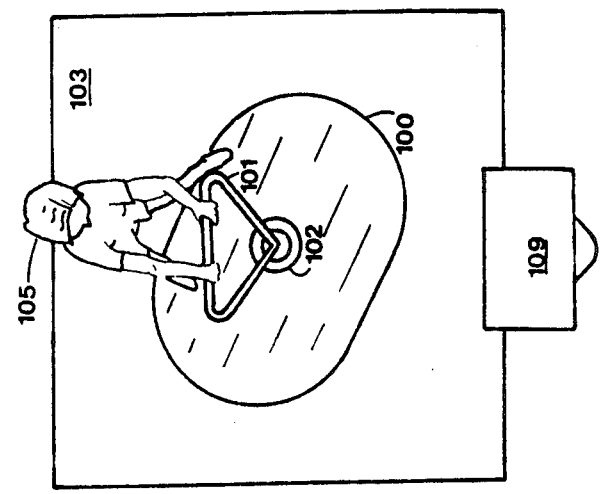

FIGS. 9, 10 and 11 illustrate the use of a sports simulator according to the invention in which provision is made for exerting the user's muscles for producing movement about a vertical axis. It has already been mentioned that a torsion sensor could be coupled to the restrained universal joint illustrated in FIGS. 6 and 7 in order to respond to a twisting movement of the handlebar as distinguished from the angular movement illustrated in FIGS. 2–5. The sports simulator illustrated in FIGS. 9–13, instead of coupling the restrained universal joint to a spring-return device permitting the twisting of the handlebar relative to the universal joint take place and to be detected for control of the game or sports display, provides a rotary platform 100 which rotates around the reactive universal joint 102 relative to the same base 103 to which the base 4 (FIGS. 6 and 7) of the universal joint is fixed, thus by rotating the platform 100 from the position shown in FIG. 9, through the position shown in FIG. 10, to the position shown in FIG. 11, the user 105 exerts himself in the same way as if he were swinging the handlebar 101 around a vertical axis while standing on a fixed platform. This may give a more realistic aspect of the resulting displacement of the scene shown on the television display 109 in azimuth and, furthermore, makes it possible to use the same reactive universal joint manufactured for use in a two-axis sport simulation in another sport simulation that requires angular movement about 3 axes, as for example in simulation of flying or maneuvering a submarine.

Figure 12:
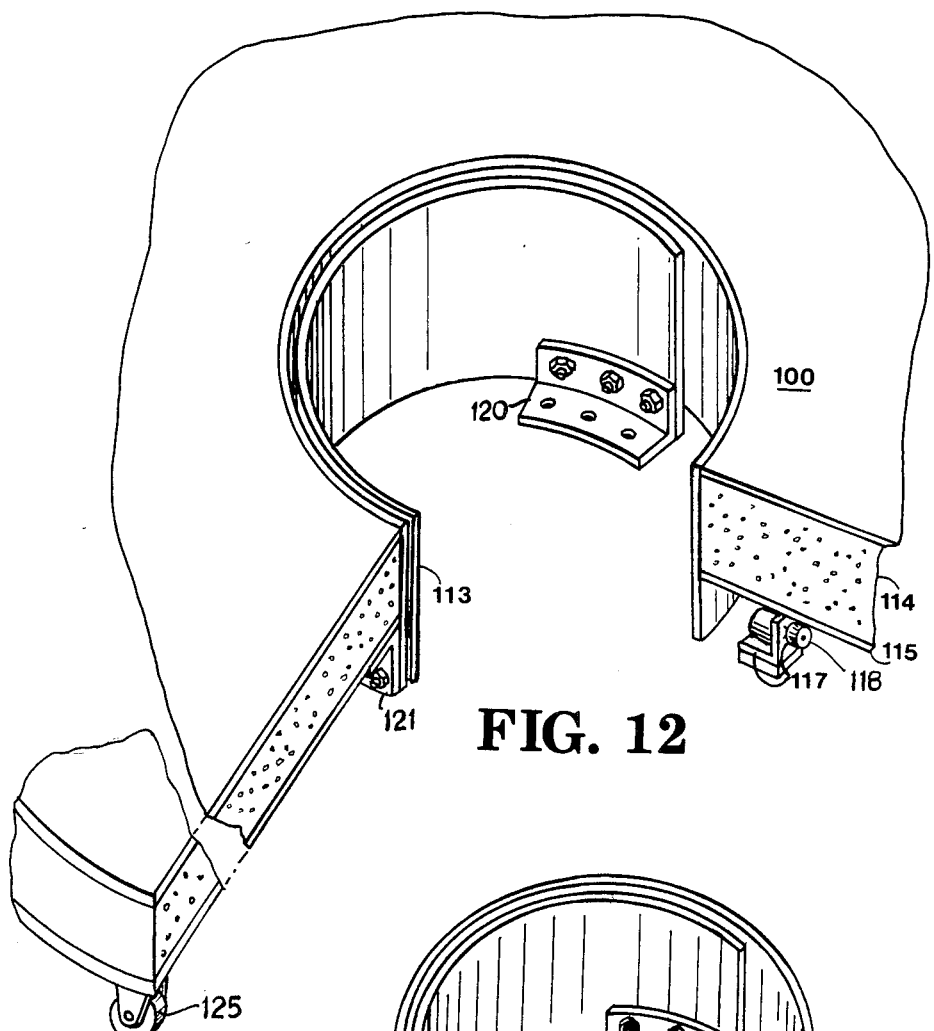
FIG. 12 is a partial perspective view, with a sector cut out to provide sectional views, of the rotary platform of FIGS. 9-11.
Figure 13:
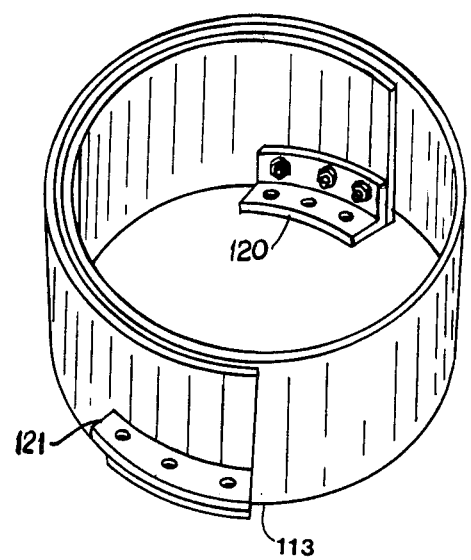
FIG. 13 is a perspective view of the flat coiled spring used for the platform of FIG. 12.

FIG. 12 illustrates one way of providing the mounting of the spring-return (i.e. reactive) platform 100 shown in FIGS. 9–11. In this case, slightly more than one and one-half turns of a flat spiral spring 113 is mounted on the base 103 around the outside of the reactive universal joint 102 which is not shown in FIGS. 12 and 13. The spring 113 has an internal diameter sufficient to provide adequate space for the reactive universal joint 102. At its inner end, the spring 113 has a bracket mounting it on the base 103 and its outer end another bracket 121 attaches the end of the spring to the platform 100 along a portion o the bottom edge of its central hole provided to its space for the spring 113 and the universal joint 102 inside it. The platform 100 is supported around its edge by a number of small wheels 125 which have their axes oriented on radii passing through the center of the central hole of the platform, so that it is not necessary for the spring 113 to carry much of the weight of the person 105 standing on the platform. Since the platform is reasonably stiff and supported around its edge, it is not necessary to keep the spring 113 more than slightly above the base 103 (to avoid friction) and the spring is accordingly stressed only around the axis of its turns.

A multi-turn potentiometer 117 fixed on the base 103 is driven by a friction wheel 118, and detects the position of the platform 100 about its vertical axis of rotation and therefore provides an appropriate signal for causing the display in the television display 109 to move in a panoramic manner.

Figure 14:
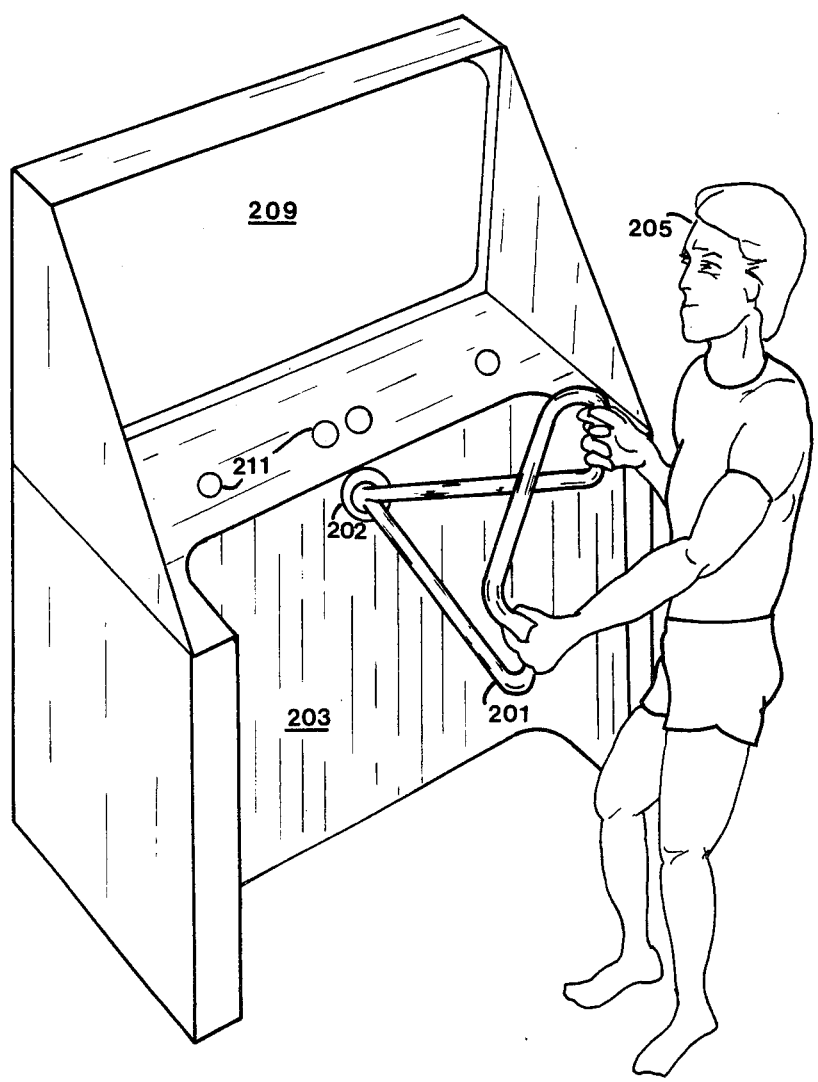
FIG. 14 is a perspective view of a sports simulator having a restrained universal joint mounted on a horizontal axis so that the control signal generator may be close to the display unit.

FIG. 14 illustrates the fact that where space is limited and the full range of body movements illustrated in FIGS. 2–5 is therefore out of the question, a more compact form of sports simulator operating on the same principle can be provided by mounting the reactive universal joint on a horizontal axis, so that the handlebar with which angular displacement is produced extends from a location just below the display which the user is watching towards the place where the user is standing. In FIG. 14, the user 205 is shown standing somewhat aside; so that the location of the reactive universal joint 202 and the disposition of the handlebar 201 may be fully shown. In this case, the cabinet 203 provides the fixed base for the reactive universal joint that also supports the display 209.

Figure 15:
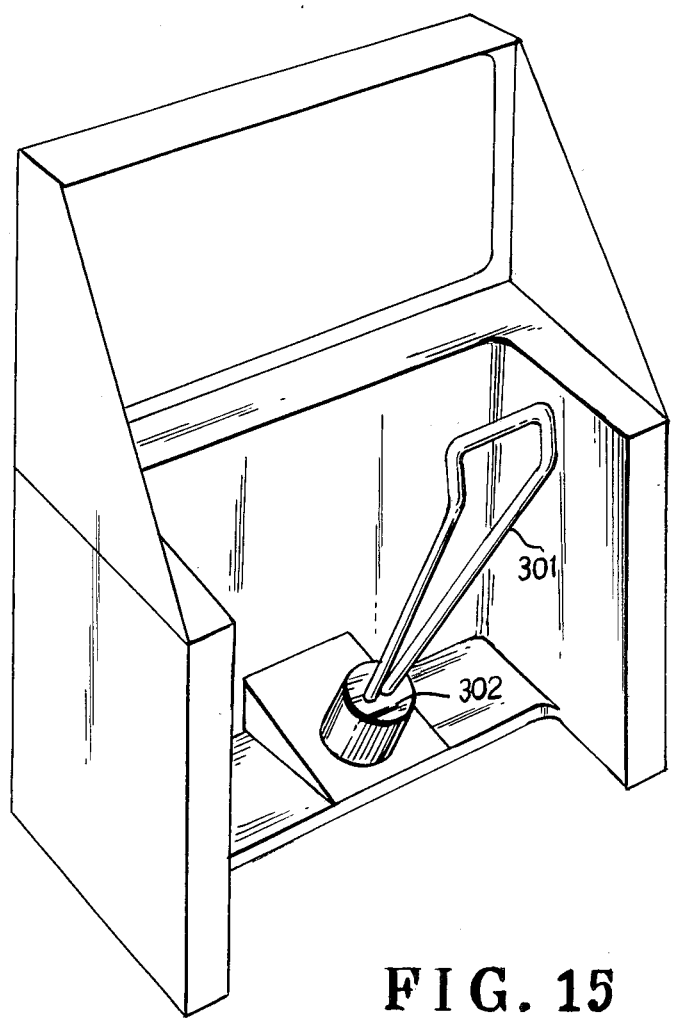
FIG. 15 is a perspective view of a modification of the sports simulator of FIG. 14 in which the restrained universal joint is mounted on an oblique axis.

It is not necessary for the universal joint 202, when mounted on a cabinet, as in FIG. 14, to be mounted on a horizontal axis at a place just below the display, but instead, as shown in FIG. 15, it may be mounted obliquely in a mid-position near the bottom of the front of the cabinet. The universal joint 302 thereshown is mounted at an axis inclined forward from the vertical by about 30° and can be swung by pushing the handle bar 301 upward, down or sideways or in any combination of vertical and lateral movement.

Figure 16:
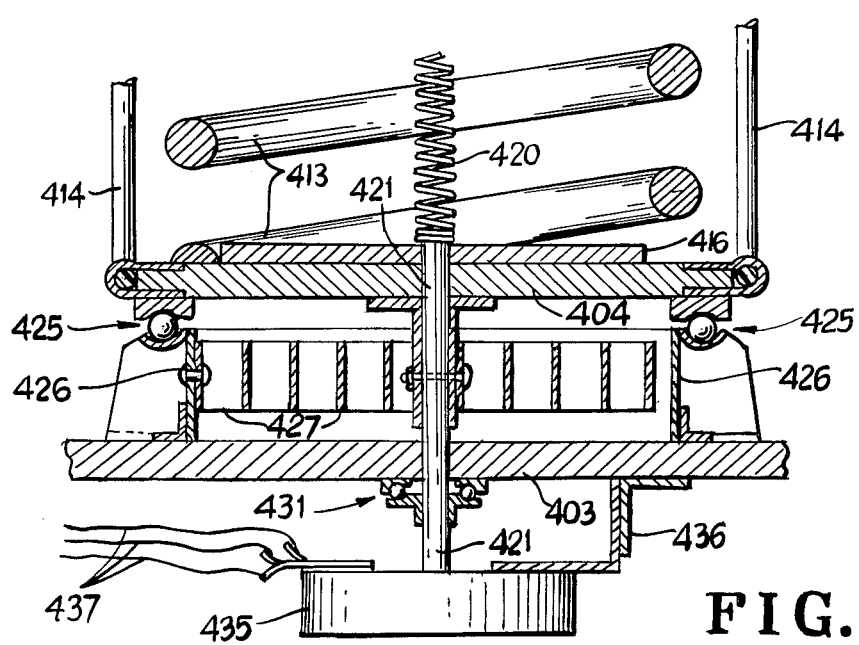
FIG. 16 shows, in section, an addition to the restrained universal joint of FIGS. 6 and 7 for providing angular control of a display about a third axis.

FIG. 16 shows, mainly in cross-section, the base mounting of a modified form of a restrained universal joint of the kind shown in FIGS. 6 and 7 in which restrained motion is permitted about the axis of the universal joint mounting. The base 404 of the universal joint corresponds to the base 4 of FIGS. 6 and 7. Only part of the spring 413 which corresponds to the spring 13 of FIGS. 6 and 7 is shown in FIG. 15. Likewise, only a part of the spring connection 420 to a joystick control not shown in FIG. 16 appears here. It corresponds to the spring connection 20 of FIGS. 6 and 7. A portion of the outer elastic restraint 414, corresponding to the elastic restraint 14 of FIGS. 6 and 7, also appears in FIG. 16.

The shaft 421, which corresponds to the post 21 of FIGS. 6 7 on which the spring connection 20 of those figures is fastened, extends downward in this case to center the base 404 in its ball-bearing support 425 which is carried by the collar 426 to which is fastened a spiral flat spring 427, the outer end of which is fastened to the collar 426 and the inner end of which is pinned to the shaft 421. The collar 426 is fixed on the base plate 403, the attitude of which determines whether the axis of the universal joint will be vertical or perhaps set at some angle to the vertical as in FIG. 15.

The shaft 421 passes through the base plate 403, preferably through a simple self-oiling bearing 430. A thrust bearing holds the universal joint down against the plate 403 while permitting rotation of the base plate 404. At the lower end of the shaft 421 is a potentiometer 435 mounted on a bracket 436 and having electric connection leads 437.

Means may, of course, be provided by members respectively affixed to the rotary base 404 and the fixed base 403 to prevent the base 404 from being rotated beyond the limits through which the potentiometer 435 may be turned. The spring 427 should be stiff enough so that such stop provisions would only occasionally come into action.

The portions of the device of FIG. 16 that extend below the base 403 may fit in a cavity in a sub-base (not shown) or else the base 403 may actually be a shallow pedestal mounted by means of a downwardly extending flange (not shown) on a true base (not shown) located below.

Ultimately, with the use of a telephone modem, competition between participants actuating identical equipment in places many miles apart can be provided on the same or on twin displays. Network or cable television can provide each of thousands of performers a display showing the performance of a number of seeded contestants and his own performance in comparison. In a similar way, a person in his own home could match his performance with a preprogrammed or live taped performance of a proficient athlete.

Although the invention has been described in detail with reference to a particular illustrative example and certain possible variations have already been mentioned, it will be understood that other variations and modifications are possible within the inventive concept.

I claim:

1. A mechanically reactive control for affecting an electronic display in response to physically exertive manipulation by a person standing on a floor or platform and enabling the person to develop bodily coordination as well as physical strength by actuating said reactive control, against opposing force presented by said control, in a manner interacting with programmed variations of the display, said mechanically reactive control comprising:

an elastically restrained universal mount having first and second members elastically coupled to each other, said first member being firmly fixed in position relative to the floor or platform, said second member being held to said first member by its elastic coupling thereto and having, in the rest position of said universal mount, a first face directed toward said first member and a second face directed away from the first member;

a hand-grippable rod structure mounted on said second face of said second universal mount member and extending, in said rest position of said mount, away from said mount to a location convenient for manipulation thereof by the person standing on the floor or platform;

a resilient elastic coupling in said mount for holding said second member thereof on said first member thereof in such a way as to require substantial force application to said rod structure by the person for displacing said rod structure and said second mount member from their rest positions in any direction of angular displacement about said coupling of said universal mount, while permitting said angular displacement to take place against a restoring force of said mount coupling, with restoring forces substantially uniform at least for swinging by the person of said rod structure in any direction, said coupling being capable of reacting to said angular displacement by elastic compression on one side thereof and elastic extension on the side thereof opposite to the elastically compressed side, whereby a center of rotation for said angular displacement is confined to a mid-region of said elastic coupling;

an angular position sensor held in said universal mount for providing an electrical output indicative of the relative angular position of said second mount member with respect to said first mount member and thereby indicative of the angular position of said rod structure about said mount coupling, said sensor having an angularly displaceable element having a center of angular rotation in said mid-region of said elastic coupling and disposed so as to follow, in a substantially proportional manner, relative angular displacement of said second mount member with respect to said first mount member and means for resolving an angular displacement of said element with respect to the rest position of said mount into rotations about mutually perpendicular axes and producing electrical signals representative of said rotations about said respective axes.

2. A mechanically reactive control for an electronic display according to claim 1 in which said elastically restrained universal mount is capable of permitting displacement of said rod structure from said unactuated position thereof by an angle of at least 60° about said center of rotation for angular displacement as a fulcrum in any direction of such displacement.

3. Reactive control for an electronic display according to claim 1 in which said first member of said universal mount is held on a substantially vertical panel of a cabinet which carries an electronic display device at a level higher than said universal mount, said universal mount being held on said panel in such a manner that said rod structure extends forward from said panel, in the unstressed condition of said universal mount, in the general direction in which said electronic display faces.

4. A mechanically reactive control according to claim 1, in which said rod structure had hand-grippable portions which are spaced apart horizontally in the rest position of said rod structure and of said universal mount, for respectively being gripped by the two hands of said person.

5. A mechanically reactive control for an electronic display according to claim 4 in which one of said mutually perpendicular axes of said angular position sensor is aligned substantially parallel to the line between said laterally spaced locations for grasping said rod structure in the unactuated position of said rod structure.

6. A mechanically reactive control for an electronic display according to claim 1 in which said first member of said universal mount is located on or near the floor or platform and said second member of said universal mount is located above said first member thereof, said rod structure extending generally upward from said second universal mount member.

7. A mechanically reactive control for an electronic display according to claim 6 in which said first member of said universal mount is held on a platform adapted for being based on a floor, in such a manner that said rod structure extends, in the unstressed condition of said mount, in a substantially vertical direction.

8. A mechanically reactive control for an electronic display according to claim 6 in which said first member of said universal mount is fixed on a base member stationarily suppored close to the platform or floor, in such a manner that said rod structure extends, in the unstressed condiition of said mount, in an obliquely upward direction.

9. A mechanically reactive control for affecting an electronic display in response to physically exertive manipulation by a person standing on a floor or platform and enabling the person to develop bodily coordination as well as physical strength by actuating said reactive control in a manner interacting with program variations of the display, said mechanically reactive control comprising:

an elastically restrained universal mount having first and second members elastically coupled to each other, said first member being firmly fixed in position relative to the floor or platform, said second member being held to said first member by its elastic coupling thereto and having, in the rest position of said universal mount, a first face directed towards said first member and a second face directed away from the first member;

a hand-grippable rod structure mounted on said second face of said second universal mount member and extending, in said rest position of said mount, away from said mount to a location convenient for manipulation thereof by the person standing on the floor or platform;

(a) resilient elastic coupling in said mount for holding said second member thereof on said first member thereof in such a way as to require substantial force application to said rod structure by the person, for displacing said rod structure and said second mount member from their rest positions in any direction of angular displacement about said coupling of said universal mount, while permitting said angular displacement to take place against a restoring force of said mount coupling, with restoring forces substantially uniform at least for swinging by the person of said rod structure in any direction about said mount coupling as a fulcrum, said resilient coupling comprising a first resilient member stressed mainly in compression and a second resilient member located radially outside of and surrounding said first resilient member and stressed in tension;

an angular position sensor held in said universal mount for providing an electrical output indicative of the relative angular position of said second mount member with respect to said first mount member and thereby indicative of the angular position of said rod structure about said mount coupling, said sensor having an angularly displaceable element disposed so as to follow relative angular displacement of said second mount member with respect to said first mount member and means for resolving an angular displacement of said element with respect to the rest position of said mount into rotations about mutually perpendicular axes and producing electrical signals representative of said rotations about said respective axes;

said coupling being of a construction to permit bending in any direction substantially about a center of rotation for said rod structure which center is located within said universal mount, said sensor being located substantially at said rotation center.

10. A mechanicall reactive control according to claim 9 in which one of said mutually perpendicular axes of said angular position sensor is aligned substantially parallel to the line between said laterally spaced locations for grasping said rod structure in the unactuated position of said rod structure.

11. A mechanically reactive control for an electronic display according to claim 9 in which said first resilient member encloses a cylindrical empty space in which is located angular position sensor.

12. A mechanically reactive control for an electronic display according to claim 11 in which said sensor includes a third resilient member of relatively low restoring force and of elongated form for pulling said angularly displaceable element into alignment with the angularly displaced attitude of said rod structure.

13. A mechanically reactive control for an electronic display according to claim 9 in which said first resilient member is a metal coil spring of which the turns are spaced apart in the rest position thereof and in which said second resilient member is a lacing of elastic cord.

14. A mechanically reactive control for affecting an electronic display in response to physically exertive manipulation by a person standing on a floor or platform and enabling the person to develop bodily coordination as well as physical strength by actuating said reactive control in a manner interacting with programmed variations of the display, said mechanically reactive control comprising:

an elastically restrained universal mount having first and second members elastically coupled to each other, said first member being firmly fixed in position relative to the floor or platform, said second member being held to said first member by its elastic coupling thereto and having, in the rest position of said universal mount, a first face directed towards said first member and a second face directed away from said first member;

a hand-grippable rod structure mounted on said second face of said second universal mount member and extending, in said rest position of said mount, away from said mount to a location convenient for manipulation thereof by the person standing on the floor or platform;

a resilient elastic coupling in said mount for holding said second member thereof on said first member thereof in such a way as to require substantial force application to said rod structure by the person for displacing said rod structure and said second mount member from their rest positions in any direction of angular displacement about said coupling of said universal mount, while permitting said angular displacement to take place against a restoring force of said mount coupling with restoring forces substantially uniform at least for swinging by the person of said rod structure in any direction about said mount coupling as a fulcrum;

means for adjusting the restoring force of said elastically restrained universal mount;

an angular position sensor held in said universal mount for providing an electrical output indicative of the relative angular position of said second mount member with respect to said first mount member and thereby indicative of the angular position of said rod structure about said mount coupling, said sensor having an angular displaceble element disposed so as to follow relative angular displacement of said second mount member with respect to said first mount member and means for resolving an angular displacement of said element with respect to the rest position of said mount into rotations about mutually perpendicular axes and producing electrical signals representative of said rotations about said respective axes;

said coupling being of a construction to permit bending in any direction substantially about a center of rotation for said rod structure which center is located within said universal mount, said sensor being located substantially at said rotation center.

15. A mechanically reactive control according to claim 14 in which one of said mutually perpendicular axes of said angular position sensor is aligned substantially parallel to the line between said laterally spaced locations for grasping said rod structure in the unactuated position of said rod structure.

* * * * *